(12) United States Patent
Smelser

(10) Patent No.: US 7,174,680 B2
(45) Date of Patent: Feb. 13, 2007

(54) BEARING BRACE APPARATUS

(75) Inventor: James M. Smelser, Sandy, UT (US)

(73) Assignee: SME Steel Contractors, Inc., West Jordan, UT (US)

( * ) Notice: Subject to any disclaimer, the term of this patent is extended or adjusted under 35 U.S.C. 154(b) by 0 days.

(21) Appl. No.: 10/158,738

(22) Filed: May 29, 2002

(65) Prior Publication Data

US 2003/0221389 A1 Dec. 4, 2003

(51) Int. Cl.
*E04B 1/98* (2006.01)
*E04H 9/02* (2006.01)

(52) U.S. Cl. .................. 52/167.3; 52/167.1; 52/167.8; 52/721.4; 52/736.3; 52/724.1; 52/724.5

(58) Field of Classification Search .............. 52/164.9, 52/167.7, 167.1, 167.3, 167.8, 721.4, 723.1, 52/724.1, 724.5, 736.3, 738.1
See application file for complete search history.

(56) References Cited

U.S. PATENT DOCUMENTS

| | | | | |
|---|---|---|---|---|
| 312,349 | A | * | 2/1885 | Griffin .................... 52/721.4 |
| 646,503 | A | * | 4/1900 | O'Shea ..................... 52/347 |
| 1,804,320 | A | * | 5/1931 | Cross ........................ 52/249 |
| 3,232,638 | A | | 2/1966 | Hollander .................. 285/55 |
| 3,355,852 | A | * | 12/1967 | Lally ....................... 52/721.4 |
| 4,079,165 | A | * | 3/1978 | Morley ..................... 428/366 |
| 4,255,071 | A | * | 3/1981 | Koppers et al. ........... 405/290 |
| 4,281,487 | A | * | 8/1981 | Koller ..................... 52/167.1 |
| 4,605,106 | A | * | 8/1986 | Fyfe et al. ................. 188/374 |
| 5,175,972 | A | | 1/1993 | Sridhara ..................... 52/727 |
| 5,327,694 | A | * | 7/1994 | Gamel et al. .............. 52/721.4 |
| 5,471,810 | A | * | 12/1995 | Sugisawa et al. .......... 52/731.7 |

(Continued)

FOREIGN PATENT DOCUMENTS

IN 155036 7/1982

(Continued)

OTHER PUBLICATIONS

Nippon Steel Corp., Steel Structure Div., Toykyo Japan, "Unbonded Brace" (Applicant makes no claim that this is prior art and have no idea when the brochure was published).

(Continued)

*Primary Examiner*—Phi Dieu Tran A
(74) *Attorney, Agent, or Firm*—Craig Metcalf; Snell & Wilmer L.L.P.

(57) ABSTRACT

The present invention is directed to a brace apparatus having a core member configured to absorb energy generated by seismic or other forces by undergoing plastic deformation. A buckling restraining assembly is included for maintaining the structural integrity of the brace after the core member has undergone plastic deformation. The buckling restraining assembly includes one or more bearings is located proximal the core member. The bearings are adapted to minimize friction between the core member and the buckling restraining apparatus. An air gap is positioned between the core member and the one or more bearings of the buckling restraining apparatus are adapted to prevent bonding of the core member and buckling restraining assembly. Projections are included in the core member of the brace apparatus to minimize movement of the middle portion of the core member relative to the buckling restraining assembly.

34 Claims, 7 Drawing Sheets

U.S. PATENT DOCUMENTS

| | | | | |
|---|---|---|---|---|
| 5,560,162 A | * | 10/1996 | Kemeny | 52/167.3 |
| 5,678,365 A | * | 10/1997 | Venegas, Jr. | 52/174 |
| 5,946,866 A | * | 9/1999 | Weglewski et al. | 52/167.1 |
| 6,219,988 B1 | * | 4/2001 | Mahfouz et al. | 52/721.4 |
| 6,223,483 B1 | * | 5/2001 | Tsukagoshi | 52/167.1 |
| 6,354,047 B1 | * | 3/2002 | Shimoda et al. | 52/167.1 |
| 6,467,749 B1 | * | 10/2002 | van de Camp | 249/48 |
| 6,530,182 B2 | * | 3/2003 | Fanucci et al. | 52/167.3 |
| 2001/0000840 A1 | * | 5/2001 | Takeuchi et al. | 52/167.1 |
| 2003/0205008 A1 | | 11/2003 | Sridhara | |

FOREIGN PATENT DOCUMENTS

| | | | | |
|---|---|---|---|---|
| JP | 63-251639 | * | 10/1988 | 52/167.1 |
| JP | 1-187271 | | 7/1989 | |
| JP | 178681 | * | 7/1989 | 52/721.4 |
| JP | 187271 | * | 7/1989 | 52/167.3 |
| JP | 3-199542 | | 8/1991 | |
| JP | 3-199581 | | 8/1991 | |
| JP | 3-199582 | | 8/1991 | |
| JP | 3-253675 | * | 11/1991 | 52/167.1 |
| JP | 3-262881 | | 11/1991 | |
| JP | 262881 | * | 11/1991 | 52/167.3 |
| JP | 4-30046 | * | 2/1992 | 52/167.1 |
| JP | 4-70438 | | 3/1992 | |
| JP | 4-19121 | | 4/1992 | |
| JP | 5-9977 | | 1/1993 | |
| JP | 5-71242 | * | 3/1993 | 52/167.1 |
| JP | 5-133137 | | 5/1993 | |
| JP | 5-57110 | | 7/1993 | |
| JP | 5-57111 | | 7/1993 | |
| JP | 7-229204 | | 8/1995 | |
| JP | 7-324377 | | 12/1995 | |
| JP | 7-324378 | | 12/1995 | |
| JP | 9-221830 | | 8/1997 | |
| JP | 9-328813 | | 12/1997 | |
| JP | 10-110470 | | 4/1998 | |
| JP | 10-306498 | | 11/1998 | |
| JP | 11-29978 | | 2/1999 | |
| JP | 11-29987 | | 2/1999 | |
| JP | 11-117404 | | 4/1999 | |
| JP | 11-153194 | | 6/1999 | |
| JP | 11-159010 | | 6/1999 | |
| JP | 11-172783 | | 6/1999 | |
| JP | 11-172784 | | 6/1999 | |
| JP | 11-280294 | | 10/1999 | |
| JP | 2000-27292 | | 1/2000 | |
| JP | 2000-27293 | | 1/2000 | |
| JP | 2000-45562 | | 2/2000 | |
| JP | 2000-96867 | | 4/2000 | |
| JP | 2000-110257 | | 4/2000 | |
| JP | 2000-144900 | | 5/2000 | |
| JP | 2000-186372 | | 7/2000 | |
| JP | 2000-265602 | | 9/2000 | |
| JP | 2000-265706 | | 9/2000 | |
| JP | 2000-328669 | | 11/2000 | |
| JP | 2001-132112 | | 5/2001 | |
| JP | 2001-214541 | | 8/2001 | |
| JP | 88910 A | * | 3/2002 | 52/167.9 |
| JP | 5-3402 | | 1/2003 | |
| WO | WO-02/22994 A1 | | 3/2002 | |

OTHER PUBLICATIONS

"Fully Braced for Seismic Survival," Engineering, Jul. 19, 1997, pp. 34-36.

Nippon Steel Corp., Building Construction and Urban Development Divs., Engineering Business Organization (to the best of Applicant's knowledge and belief, this reference was published at least as early as 1998).

English Translation of Japanese Patent No. 5-57111, pp. 1-7.

Tube Investment of India Ltd, A Report on the New Concept of Sleeved Column and its Applicatiosn, Aug. 28, 2001 (While applicant is not aware if or when this reference may have been published, to the best of the applicant's knowledge and belief, this reference was published prior to the date of the above referenced patent.)

Eric Ko, Andrew Mole, Ian Aiken, Frederick Tajirian, Zigmund Rubel and Isao Kimura, Application of the Unbonded Brace in Medical Facilities, Jul. 2002 (While applicant is not aware if or when this reference may have been published, to the best of the applicant's knowledge and belief, this reference was published prior to the date of the above referenced patent.)

Parry Brow, S.E., Ian D. Aiken, Ph.D., P.E., F. Jeff Jafarzadeh, P.E., Seismic Retrofit of the Wallace F. Bennett Federal Building, Aug. 2001.

Ian D. Aiken and Isao Kimura, The Use of Buckling-Restrained Braces in the United States (While applicant is not aware if or when this reference may have been published, to the best of the applicant's knowledge and belief, this reference was published prior to the date of the above referenced patent.)

David B. Rosenbaum, 'New' Seismic-Resistant System Finally Gets Warm U.S. Welcome, Jun. 3, 2002.

Gil Davis, Catch the next Wave, Apr. 2002.

Rafael Sabelli, Stephen Mahin and Chunho Chang, Seismic Demands on Steel Braced Frame Buildings with Buckling-Restrained Braces (While applicant is not aware if or when this reference may have been published to the best of the applicant's knowledge and belief, this reference was published prior to the date of the above referenced patent.).

Atsushi Watanabe, Yasuyoshi Hitomi, Eilchiro Saeki, Akira Wada, and Morihisa Pujimoto, Properties of Brace Encased in Buckling-Restraining Concrete and Steel Tube, Aug. 1988 (While Applicant is not aware of the exact date of publication, to the best of applicant's knowledge and belief this reference was published prior to the filing date of the above referenced application).

Peter Clark, Ian Aiken, Kazuhiko Kasai, Eric Ko, and Isao Kimura, Design Procedures for Buildings Incorporating Hysteretic Damping Devices, Oct. 1999 (While applicant is not aware of the exact date of publication; to the best of applicants knowledge and belief this reference was published prior to the filing date of the above referenced application).

* cited by examiner

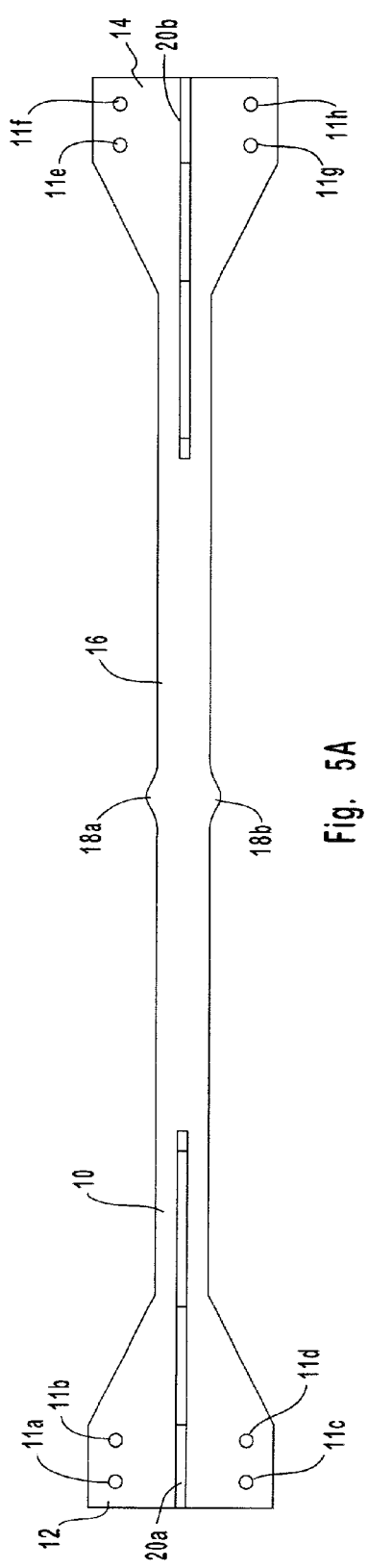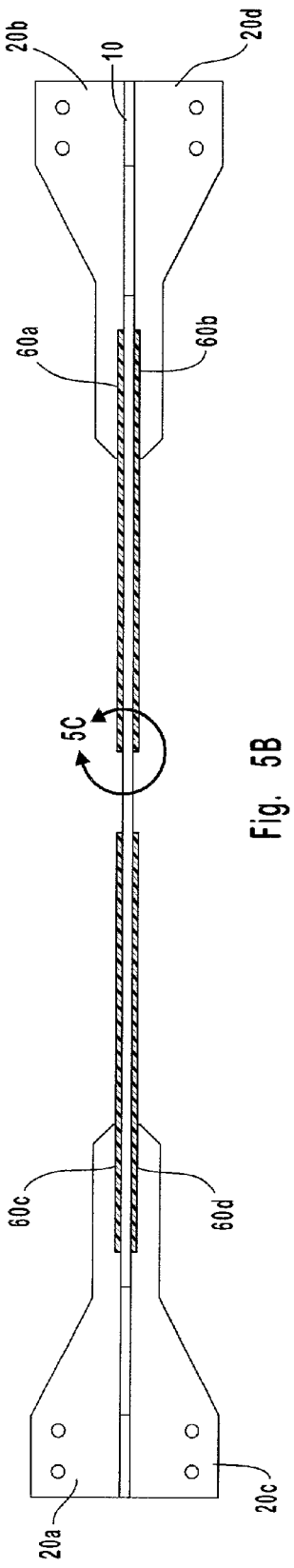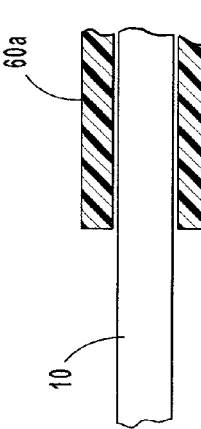

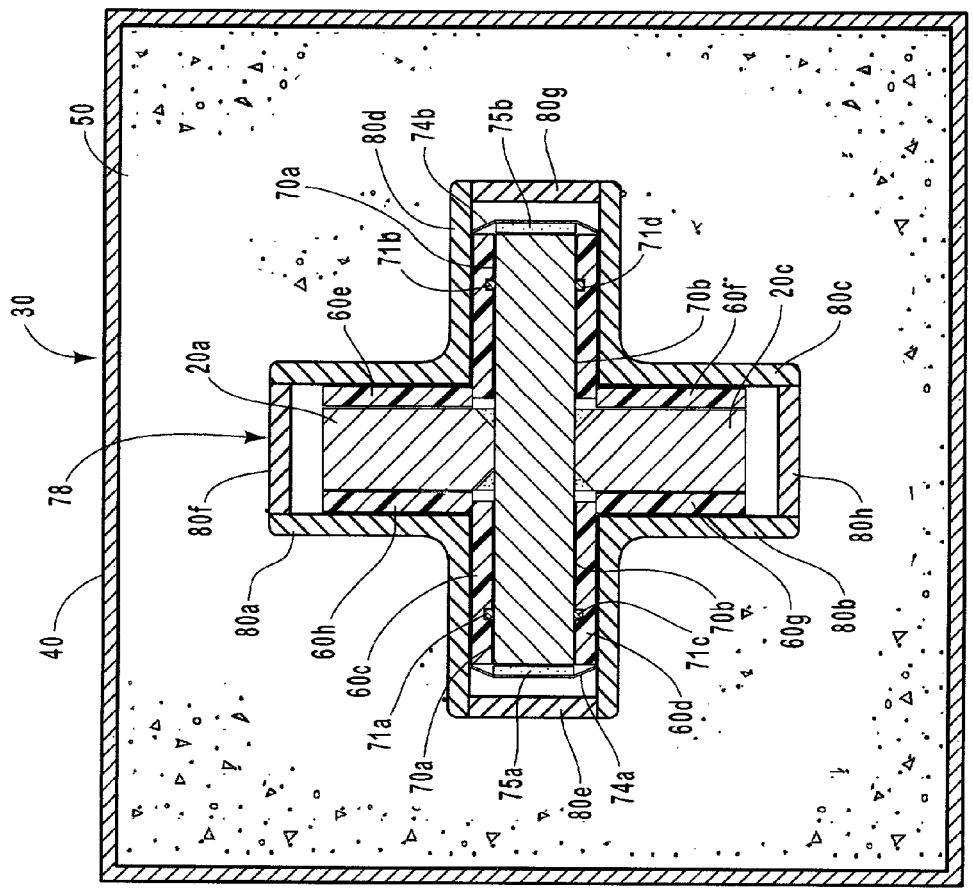
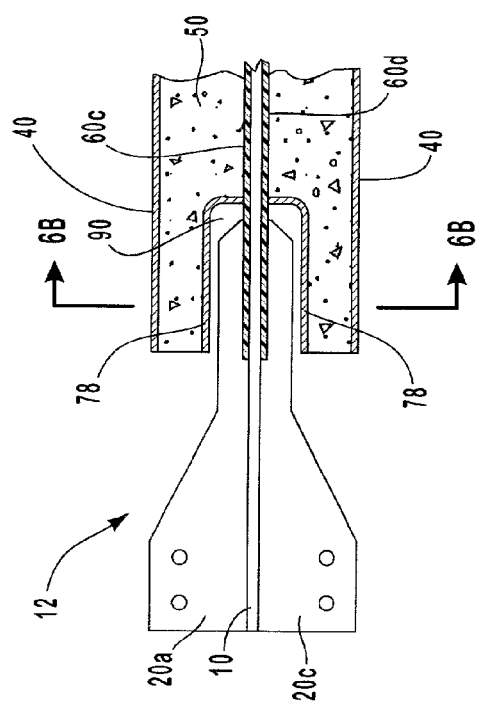
Fig. 6B
Fig. 6A

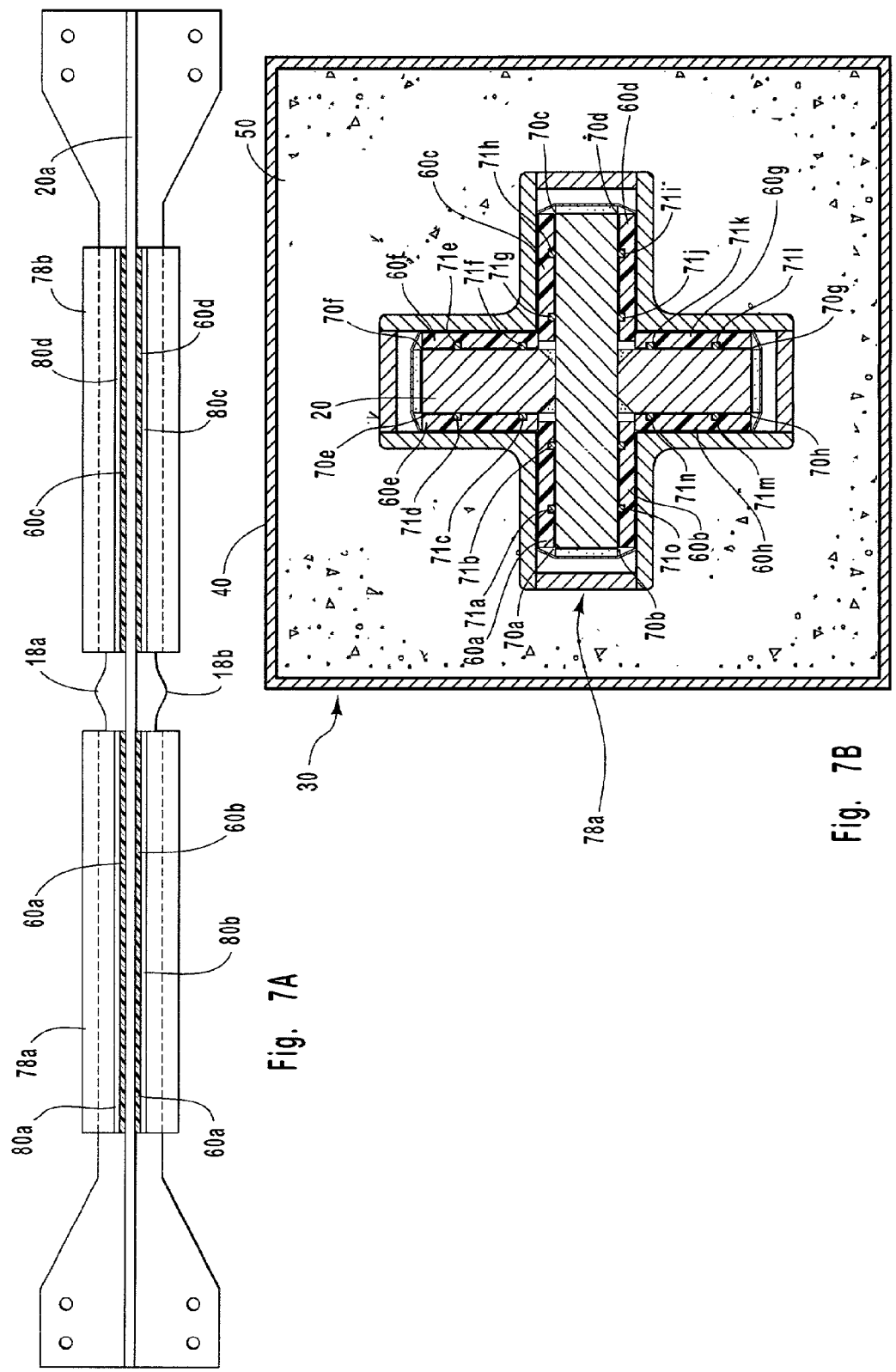

BEARING BRACE APPARATUS

BACKGROUND OF THE INVENTION

1. The Field of the Invention

The present invention relates to structural braces. More particularly, the present invention relates to a brace apparatus having a core member and a buckling restraining assembly, the buckling restraining assembly having one or more bearings located proximal the core member being adapted to minimize friction between the core member and the buckling restraining apparatus. An air gap is positioned between the core member and the one or more bearings of the buckling restraining apparatus to prevent bonding of the core member and buckling restraining assembly.

2. The Relevant Technology

For decades steel frame structures have been a mainstay in the construction of everything from low-rise apartment buildings to enormous skyscrapers dominating modern city sky lines. The strength and versatility of steel is one reason for the lasting popularity of steel as a building material. In recent years, steel frame structures have been the focus of new innovation. Much of this innovation is directed to minimize the effects of earthquakes experienced in the locations where steel frame structures are used. Earthquakes provide a unique challenge to building construction due to the magnitude of the forces that can be exerted on the frame of the building. A variety of building techniques have been utilized to minimize the impact of seismic forces exerted on buildings during an earthquake.

One mechanism that has been developed to minimize the impact of seismic forces is a structural brace that is adapted to absorb seismic energy through plastic deformation. While the brace is adapted to absorb energy by plastic deformation, it is also configured to resist buckling. While several embodiments of these energy absorbing braces exist, one popular design incorporates a steel core and a concrete filled bracing element. The steel core includes a yielding portion adapted to undergo plastic deformation when subjected to seismic magnitude forces. Compressive and/or tensile forces experienced during an earthquake are absorbed by compression or elongation of the steel core. While the strength of the steel core will drop as a result of buckling, the concrete filled bracing element provides the required rigidity to allow the structural brace to function. In short, the steel core is adapted to dissipate seismic energy while the concrete filled bracing element is adapted to maintain the integrity of the structural brace when the steel core is deformed. The use of energy absorbing braces allows a building to absorb the seismic energy experienced during an earthquake. This permits buildings to be designed and manufactured with lighter, less massive, and less expensive structural members while maintaining the ability to withstand forces produced during an earthquake.

One difficulty in the design of the energy absorbing braces is that the steel core must be allowed to move independently of the bracing element. To allow the steel core to move independently of the bracing element, the steel core is prevented from bonding with the bracing element during manufacture of the energy absorbing brace. By preventing the steel core from bonding to the bracing element, the steel core can absorb seismic energy imparted by the ends of the structural brace without conveying the energy to the bracing element. For example, during an earthquake the steel core is displaced relative to the bracing element as the steel core undergoes compression and elongation.

One design that has been developed to prevent bonding of the steel core and the bracing element utilizes an asphaltic rubber layer positioned between the steel core and the bracing element. The asphaltic rubber layer is bonded to both the steel core and the bracing element. However, using an asphaltic rubber layer to prevent bonding of the steel core and the bracing element results in difficulties as well. When seismic forces are exerted on the brace, compression and elongation of the steel core shears the asphaltic rubber layer. Deformation of the steel core and shearing of the substantially non-compressible asphaltic rubber layer results in enormous pressure being exerted on the asphaltic rubber layer. Additionally, the asphaltic rubber layer deteriorates after a limited number of compression and elongation cycles.

Yet another difficulty encountered relates to manufacturing of the brace. Where the bracing element utilized in the energy absorbing brace comprises a concrete filled tube, manufacturing the brace is complex. Concrete filled bracing elements are typically manufactured by positioning the tube vertically, placing a steel core covered with asphaltic rubber inside the tube, and pouring concrete into the tube. This method of manufacturing concrete filled braces results in compression of the asphaltic rubber at one end of the element more than the other end of the element. Because the thickness of the asphaltic rubber layer can play an important role in the performance of the energy absorbing brace, complex manufacturing processes must be employed to maintain adequate consistency in the thickness of the asphaltic rubber layer.

BRIEF SUMMARY OF THE INVENTION

The present invention relates to brace apparatuses. More particularly, the present invention relates to a brace apparatus having a core member and a buckling restraining assembly. The core member is adapted to absorb energy by undergoing plastic deformation. The buckling restraining assembly maintains the structural integrity of the brace apparatus once the core member has undergone plastic deformation. The buckling restraining assembly includes one or more bearings located proximal the core member and adapted to minimize friction between the core member and the buckling restraining apparatus. An air gap is positioned between the core member and the one or more bearings of the buckling restraining apparatus to prevent bonding between the core member and the buckling restraining assembly. The use of an air gap minimizes the pressure exerted on the buckling restraining assembly during plastic deformation of the buckling restraining apparatus, allowing the core member to expand when the core member undergoes plastic deformation during a compression cycle.

According to one aspect of the present invention, one or more projections are included in the core member of the brace apparatus. The projections are adapted to be coupled to the cementious layer. In one embodiment the projections are contiguous with the middle portion of the core member and are configured to minimize movement of the middle portion of the core member relative to the portion of the buckling restraining assembly corresponding to the middle portion of the core member.

According to another aspect of the present invention, lateral supports are coupled to the core member of the brace apparatus. One or more reinforcement assemblies are provided that correspond with a portion of the lateral supports and the bearing members. The reinforcement assemblies provide additional support to the portions of the brace apparatus corresponding with the lateral supports. In one embodiment, the reinforcement assemblies are positioned between the cementious layer and the bearing members.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 5A is a schematic view illustrating the core member and lateral supports according to one embodiment of the present invention.

FIG. 5B is a perspective view illustrating the juxtaposition of the bearing members to the core member and lateral supports according to one embodiment of the present invention.

FIG. 5C is a close-up view depicting the air gap between the bearing members and the core member according to one embodiment of the present invention.

FIG. 6A is a side cross-sectional view illustrating the reinforcement assembly and its juxtaposition to the buckling restraining assembly, core member, and lateral supports according to one embodiment of the present invention.

FIG. 6B is an end cross-sectional view illustrating the reinforcement assembly and its juxtaposition to the buckling restraining assembly, core member, and lateral supports according to one embodiment of the present invention.

FIG. 7A is a perspective view illustrating an alternative embodiment of the brace apparatus in which a lateral support extends the length of the core member.

FIG. 7B is a cross-sectional view illustrating the juxtaposition of the core member, lateral supports, buckling restraining assembly and reinforcement assembly according to one embodiment of the present invention.

DETAILED DESCRIPTION OF THE PREFERRED EMBODIMENTS

The present invention relates to brace apparatuses. More particularly, the present invention relates to a brace apparatus having a core member and a buckling restraining assembly, the buckling restraining assembly having one or more bearings located proximal the core member being adapted to minimize friction between the core member and the buckling restraining apparatus. An air gap is positioned between the core member and the one or more bearings of the buckling restraining apparatus to prevent bonding between the core member and the buckling restraining assembly.

Figure 1:
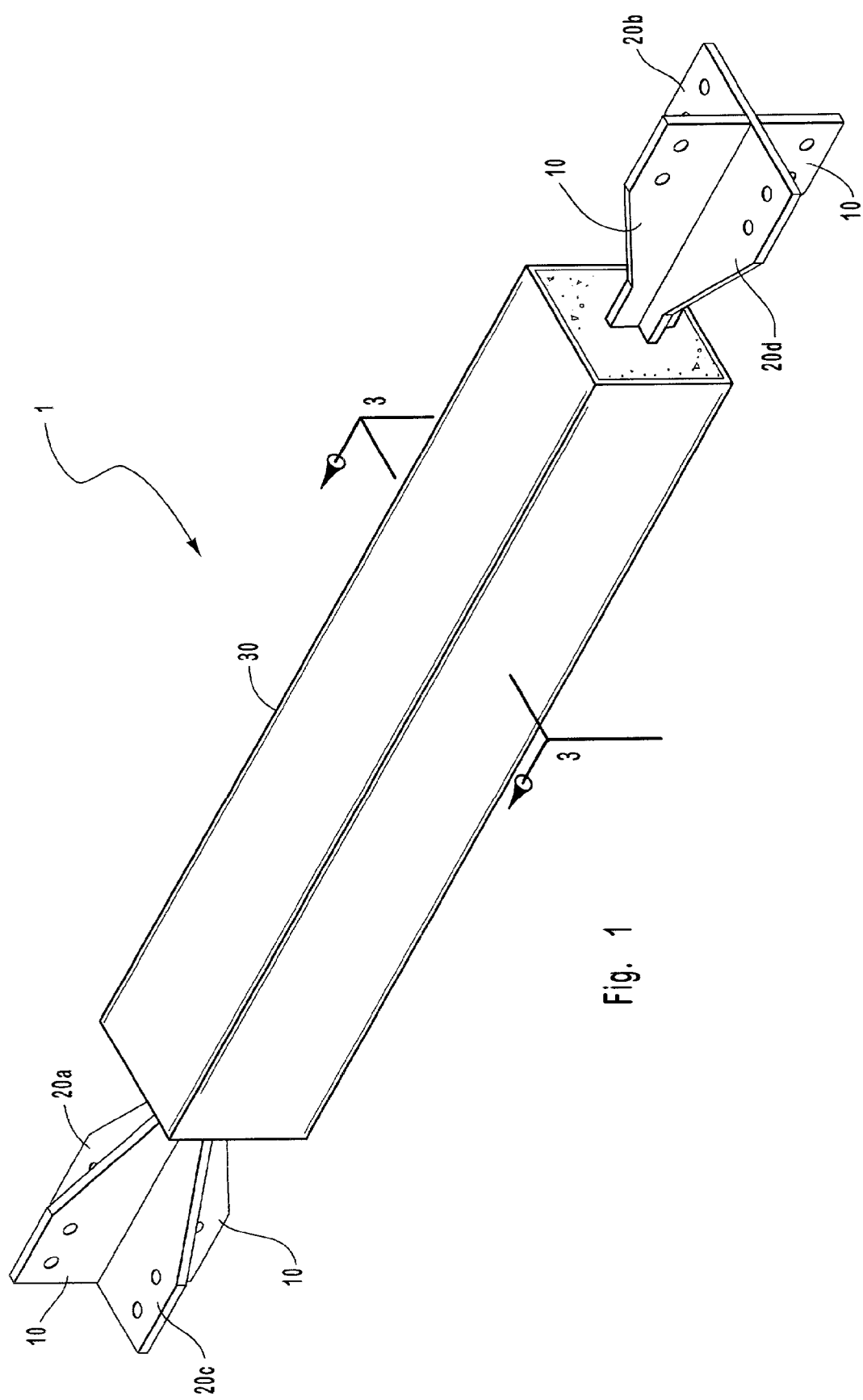
FIG. 1 is a perspective view illustrating one embodiment of the brace apparatus of the present invention.

FIG. 1 is a perspective view illustrating one embodiment of a brace apparatus 1 of the present invention. Brace apparatus 1 comprises a core member 10, lateral supports 20a,b, and a buckling restraining assembly 30. Core member 10 is adapted to absorb seismic or other forces exerted on brace apparatus 1. Depending on the characteristics of core member 10, such as size, width, length, construction, modulus of elasticity, etc., such forces will either be absorbed by the elastic qualities of the core or by plastic deformation of the core member. In the preferred embodiment, core member 10 is comprised of steel. In an alternative embodiment of the present invention, core member 10 is comprised of a non-steel metal.

Lateral supports 20a,b are attached to core member 10. Lateral supports 20a,b provide additional support to core member 10. In one embodiment, lateral supports 20a,b are adapted to provide additional support primarily to the ends of the core member 10. In an alternative embodiment, lateral supports 20a,b are adapted to provide additional support to most or all of the entire length of core member 10.

Buckling restraining assembly 30 is adapted to surround, and provide additional support, to the middle portion of core member 10. The additional support provided by buckling restraining assembly 30 allows core member 10 to absorb large amounts of force by plastic deformation while maintaining the structural integrity the brace apparatus 1. Because plastic deformation of a core member 10 can result in buckling and substantial weakening of core member 10, the additional support provided by buckling restraining assembly 30 provides the support needed to maintain the structural integrity of the brace apparatus 1 under the magnitude of forces experienced during an earthquake, explosion, or the like. A variety of types and configurations of buckling restraining assembly 30 are possible without departing from the scope and spirit of the present invention. Illustrative embodiments of buckling restraining assembly 30 will be discussed with reference to FIGS. 3–7.

Figure 2A:
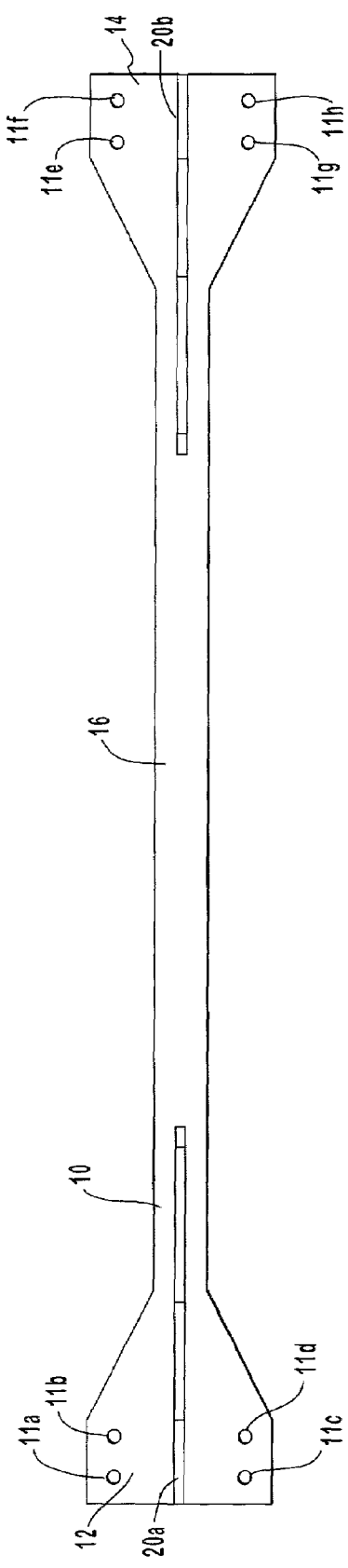
FIG. 2A is a side view illustrating one embodiment of the core member of the present invention.

FIG. 2A is a side view illustrating one embodiment of the core member 10 of the present invention. In the illustrated embodiment, the core member 10 comprises a metal core support of uniform construction. The core member comprises a core member first end 12, a core member second end 14, and a core member middle portion 16. The core member first end 12 is configured to be wider than the core member middle portion 16, thus providing additional rigidity to the core member first end 12 in the vertical direction. The core member first end 12 includes holes 11a–d. Holes 11a–d are adapted to provide a mechanism for coupling the brace apparatus 1 to other structural members.

The core member second end 14 is also wider than the core member middle portion 16, thus providing additional rigidity to the core member second end 14 in the vertical direction. The core member second end 14 also includes holes 11e–h. Holes 11e–h are adapted to provide a mechanism for coupling the brace apparatus 1 to other structural members. The core member middle portion 16 is narrower than the core member first end 12 and the core member second end 14. As previously mentioned, core member 10 is adapted to absorb seismic or other forces exerted on the brace apparatus. The core member middle portion 16 is adapted to yield under earthquake magnitude loads. The narrow configuration of core member middle portion 16 renders the core member middle portion 16 more susceptible to buckling under extreme forces. This permits core member middle portion 16 to absorb much of the seismic or other energy through plastic deformation while maintaining the integrity of the core member first and second ends 12, 14. The amount of energy that can be absorbed by the core member middle portion 16, and the amount of energy required to result in plastic deformation of the core member middle portion 16, will vary based on the attributes of the middle portion such as size, width, length, construction, modulus of elasticity, etc. As will be appreciated by those skilled in the art, the core member is not limited to the embodiment of FIG. 2A, but can be of a variety of types and configurations.

Figure 2B:
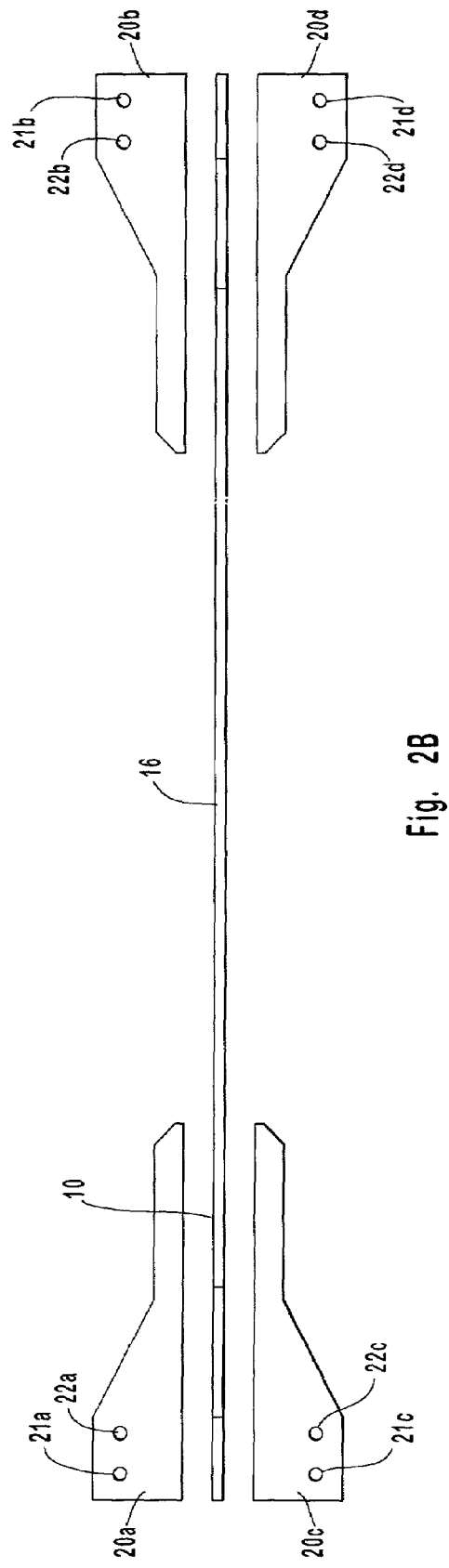
FIG. 2B is a top schematic view illustrating lateral members separated from the core member according to one embodiment of the present invention.

FIG. 2B is a top view illustrating lateral supports 20a–d separated from core member 10 according to one embodiment of the present invention. Lateral supports 20a–d are adapted to provide additional support to the core member. In the illustrated embodiment, lateral supports comprise a plurality of lateral supports including, first lateral support 20a, second lateral support 20b, third lateral support 20c, and fourth lateral support 20d.

Lateral supports 20a–d provide additional support to the core member first end 12 and the core member second end 14. By providing additional support, the portions of the core member 10 corresponding with the lateral supports 20a–d are less likely to buckle. By rendering some portions of the core member 10 less likely to buckle, portions of the core member 10 not corresponding with the lateral supports 20a–d are more likely to undergo plastic deformation when a seismic magnitude force is exerted on brace apparatus 1. Because, the position of the lateral supports 20a–d strengthens core member first and second ends 12, 14, the core member middle portion 16 is more likely to buckle when intense pressure is exerted on the brace apparatus 1.

The buckling of the core member middle portion 16, while weakening core member 10, does not prevent brace apparatus 1 from carrying a load because the core member middle portion 16 is supported by the buckling restraining assembly 30. The core member first and second ends 12, 14, while not benefiting from the support of the buckling restraining assembly 30, nevertheless are prevented from buckling by lateral supports 20a–d. As will be appreciated by those skilled in the art, the ability of the brace apparatus 1 to withstand a force is based on the characteristics of the brace and the magnitude of the force. Where the force exerted on brace apparatus 1 is above the amount needed to deform core member 10 and below the amount capable of resulting in the failure of brace apparatus 1, the core member will undergo plastic deformation without resulting in the failure of brace apparatus 1.

In the illustrated embodiment, lateral supports 20a–d are adapted to provide an attachment mechanism for coupling brace apparatus 1 to other structural members. A plurality of holes 21a,b,c,d and 22a,b,c,d are provided to attach brace apparatus 1 to other structural members. The first lateral support 20a includes holes 21a, 22a. The second lateral support 20b includes holes 21b, 22b. The third lateral support 20c includes holes 21c, 22c. The fourth lateral support 20d includes holes 21d, 22d. As will be appreciated by those skilled in the art, a variety of attachment mechanisms can be utilized within the scope and spirit of the present invention.

Figure 3:
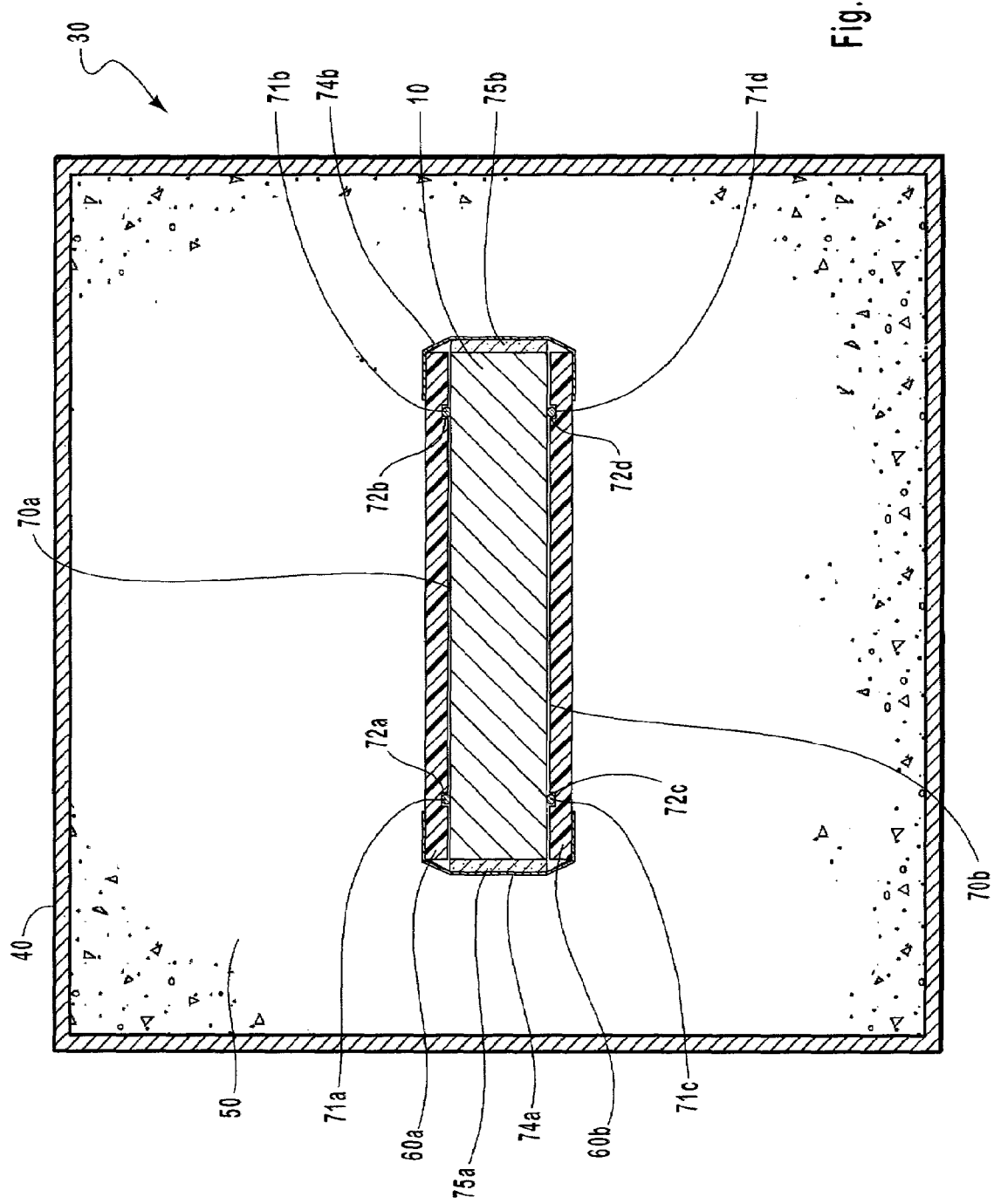
FIG. 3 is a cross-sectional view, taken along cutting plane lines 3—3 of FIG. 1, illustrating the juxtaposition of the core member and the buckling restraining assembly according to one embodiment of the present invention.

FIG. 3 is a cross sectional view illustrating the juxtaposition of the core member 10 and the buckling restraining assembly 30 according to one embodiment of the present invention. In the illustrated embodiment, core member assembly 30 is adapted to surround core member 10 to prevent the brace apparatus 1 from buckling when core member 10 undergoes plastic deformation. In the illustrated embodiment, buckling restraining assembly 30 comprises a support tube 40, a cementious layer 50, and bearing members 60a,b. Support tube 40 comprises a square metal tube external to the cementious layer 50. Support tube 40 provides strength, flexibility, and a mechanism for enclosing cementious layer 50 and bearing members 60a,b. In one embodiment, metal tube 10 surrounds the core member middle portion 10. Support tube 10 is one example of a metal support.

Cementious layer 50 is located internal to support tube 10. Cementious layer 50 provides rigidity to buckling restraining assembly 30. Cementious layer 50 is one example of a rigid layer. In one embodiment, cementious layer 50 has less elasticity than the core member 10.

Bearing members 60a,b are positioned internal to cementious layer 50. Bearing members 60a,b are adapted to limit the amount of friction caused by the movement of part or all of core member 10 relative to part or all of the buckling restraining assembly 30. The properties of bearing members 60a,b are adapted to provide a desired amount of friction limiting. In one embodiment, bearing members 60a,b comprise a first surface, a second surface and a body. The first surface is adapted to be coupled to the cementious or concrete layer. The second surface is adapted to be positioned in close proximity to the core member. The body comprises the bulk of the bearing member. In the preferred embodiment, the body of the bearing member is comprised of ultra high molecular weight (UHMW) polyethylene. In an alternative embodiment, the body is comprised of Teflon. In yet another embodiment, the body is comprised of a material having low compressibility. Similarly, the first and second surfaces can be comprised of UHWM polyethylene, Teflon, or similar materials. In one embodiment, one or more of the bearing members are configured to provide a desired amount of friction limiting. In another embodiment, one or more bearing members are configured to circumscribe core member 10. In yet another embodiment, a plurality of bearing members are included in buckling restraining assembly 30. In yet another embodiment, the plurality of bearing members are internal to, and affixed to, the rigid layer of the buckling restraining assembly.

A variety of configurations of buckling restraining assembly 30 can be utilized within the scope and spirit of the present invention. For example, in one embodiment, buckling restraining assembly 30 comprises a metal support positioned external to the core member. A cementious layer is coupled to the metal support such that the cementious layer surrounds the core member. In one embodiment, the metal support does not surround the cementious layer but is contained in the cementious layer. In another embodiment, the metal tube comprises a metal cylindrical tube circumscribing the cementious layer.

Air gaps 70a,b are positioned between core member 10 and buckling restraining assembly 30. In the illustrated embodiment, bearing member 60a is positioned adjacent a first side of the core member 10. Bearing member 60b is positioned adjacent a second side of the core member 10. Air gap 70a is positioned between bearing member 60a and the first side of core member 10, while air gap 70b is positioned between bearing member 60b and the second side of core member 10. Air gaps 70$a,b$ are configured to minimize contact between the plurality of bearing members and the core member when there is little or no load on the brace apparatus 1. Air gaps 70$a,b$ are also configured such that when the core member is compressed and plastic deformation of the core member occurs, the core member 10 contacts one or both bearing members 70$a,b$.

Air gaps 70$a,b$ are also adapted to prevent bonding of the core member 10 to the buckling restraining assembly 30. By preventing bonding of core member 10 and buckling restraining assembly 30, core member 10 can move freely with respect to buckling restraining assembly 30 when core member 10 undergoes plastic deformation. For example, where brace apparatus 1 is adapted to absorb seismic forces, the compression and tension exerted on brace apparatus 1 can compress and elongate core member 10. Air gaps 70$a,b$ are adapted to provide a void between core member 10 and the bearing members of the buckling restraining assembly 30 when the brace apparatus 1 is not supporting a load. Due to the fact that core member 10 is not bonded to buckling restraining assembly 30, when forces are exerted on brace apparatus 1, the forces are primarily absorbed by core member 10. In one embodiment, air gaps are configured such that an air gap is positioned between the core member 10 and each of the plurality of bearing members.

The configuration of bearings 60$a,b$ results in little or no friction being generated between buckling restraining assembly 30 and core member 10. When seismic, or other, forces are exerted on brace apparatus 1 core member 10 is stretched and compressed. When the forces exceed a given threshold, the forces are absorbed by plastic deformation of core member 10. In one embodiment, compressive deformation of core member 10 results in an expansion or thickening of the core member 10. This causes the core member 10 to contact buckling restraining assembly 30. Bearing members 60$a,b$ of buckling restriction assembly limit the amount of friction caused by the compression and elongation of core member 10. Additionally, the configuration of bearing members 60$a$, $b$ permits the brace apparatus 1 to undergo many cycles of compression and tension without significantly deteriorating bearing members 60$a,b$.

During the fabrication of brace apparatus 1 (as will be discussed in more detail below), spacers 71$a$–$d$ are used to create air gaps 70$a,b$ between core 10 and bearing members 60$a,b$. Spacers 71$a$–$d$ are adapted to maintain the air gaps 70$a,b$ between the portions of the core member corresponding to the plurality of bearing members of the buckling restraining assembly 30. Bearing members 60$a,b$ also include elongated slots 72$a$–$d$, which are formed along the entire length of the interior surface of bearing members 60$a,b$ and, which are adapted to receive a portion of each of the spacers 71$a$–$d$. In one embodiment, elongated slots 72$a$–$d$ are adapted to control the width of air gaps 70$a,b$. For example, in one embodiment the width of air gaps 70$a$–$d$ varies along the length of core member 10. The depth of elongated slots 72$a$–$d$ of bearing members 60$a,b$ is configured to provide variation in the width of air gaps 70$a$–$d$.

Brace apparatus 1 also includes end spacers 75$a,b$ and seals 74$a,b$. End spacers 75$a,b$ are located at the ends of core member 10. End spacers 75$a,b$ are adapted to provide a desired displacement between core member 10 and cementious layer 50. End spacers 75$a,b$ can be comprised of foam rubber, insulative materials, or any other materials providing the desired spacing. Seals 74$a,b$ are located at and/or around bearing members 60$a,b$ and end spacers 75$a,b$. Seals 74$a,b$ are adapted to prevent the cementious materials from entering air gaps 70$a,b$. Seals 74 $a,b$ can comprise tape, silicone, or any other materials adapted to prevent the cementious materials from entering air gaps as is known to one skilled in the art.

Figure 4:
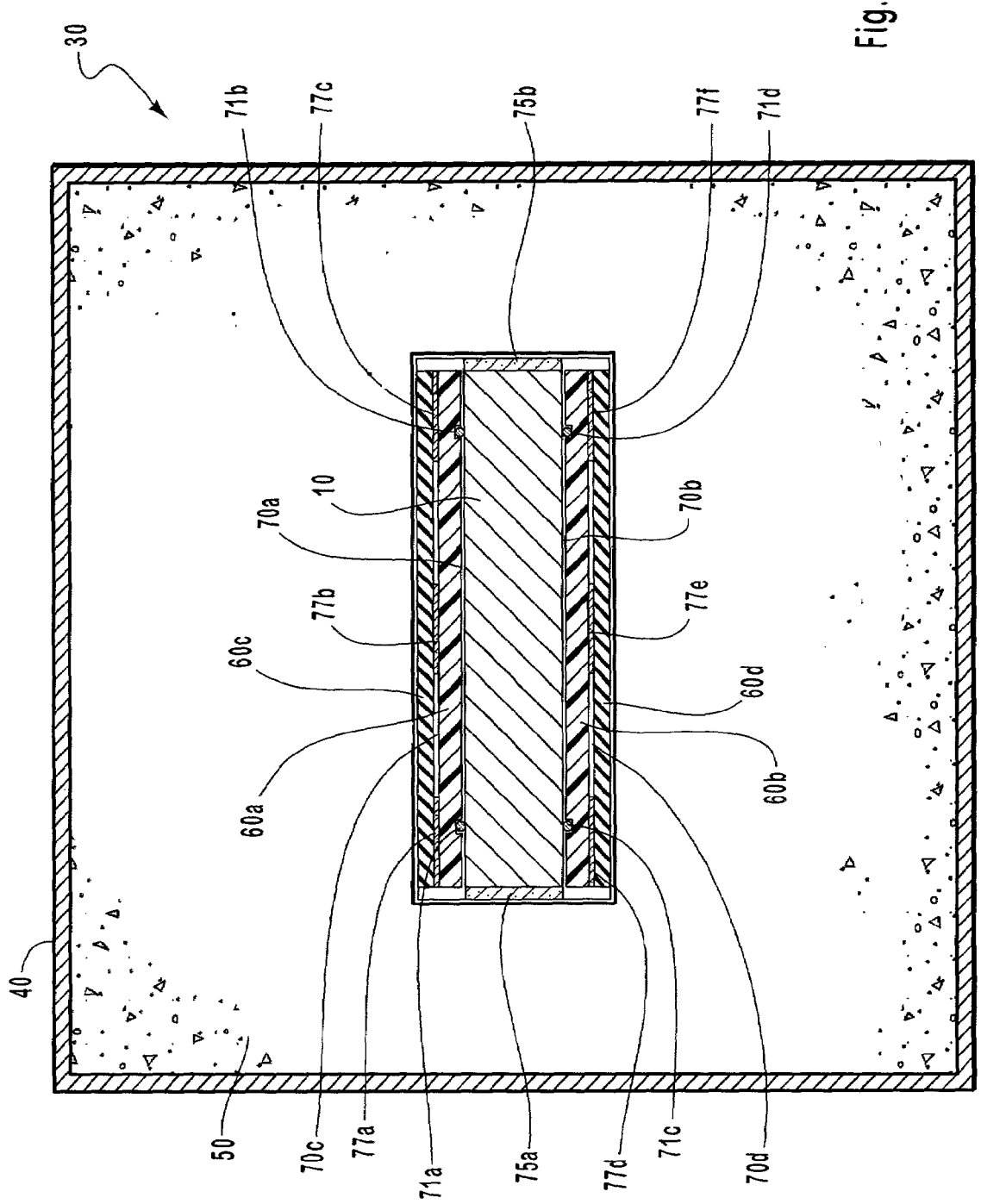
FIG. 4 is a cross-sectional view, taken along cutting plane lines 3—3 of FIG. 1, illustrating the juxtaposition of the core member and the buckling restraining assembly according to an alternative embodiment of the present invention.

FIG. 4 is a cross sectional view illustrating the juxtaposition of the core member 10 and buckling restraining assembly 30 according to an alternative embodiment of the present invention. In the illustrated embodiment, the buckling restraining assembly 30 comprises support tube 40, cementious layer 50, and four bearing members 60$a,b,c,d$. Bearing member 60$a$ is positioned adjacent a first side of core member 10. Bearing member 60$b$ is positioned adjacent a second side of core member 10. Bearing member 60$c$ is positioned between bearing member 60$a$ and the cementious layer 50. Bearing member 60$d$ is positioned between bearing member 60$b$ and the cementious layer 50. In one embodiment, bearing members 60$c,d$ are adapted to be coupled to cementious layer 50. As previously discussed, bearing members 60$a$–$d$ are adapted to limit the amount of friction caused by movement of part or all of the core member 10 relative to part or all of the buckling restraining assembly 30.

Air gap 70$a$ is positioned between bearing member 60$a$ and the first side of core member 10. Air gap 70$b$ is positioned between bearing member 60$b$ and the second side of core member 10. Yet another air gap 70$c$ is positioned between bearing members 60$a$ and 60$c$. While yet another air gap 70$d$ is positioned between bearing members 60$b$ and 60$d$. Spacers 71$a$–$d$ comprise selectively removable rods positioned in elongated slots 72$a$–$d$. Spacers 71$a$–$d$ are adapted to maintain air gaps 70$a,b$ during manufacture of brace apparatus 1. Spacing members 77$a$–$f$ are positioned between bearing members 60$a$ and 60$c$ and between bearing members 60$b$ and 60$d$. Spacing members 77$a$–$f$ are adapted to maintain the spacing between adjacent bearing members 60$a$ and 60$c$ and 60$b$ and 60$d$. In the preferred embodiment, spacing members 77$a$–$f$ are comprised of a compressible material. In one embodiment, spacing members 77$a$–$f$ are comprised of rubberized foam.

Air gaps 70$a$–$d$, spacers 71$a$–$d$, and spacing members 77$a$–$f$ are adapted to allow for expansion or an increase in the thickness of core member 10 due to plastic deformation caused by compression of core member 10. In one embodiment, spacing members 77$a$–$f$ are configured such that when little or no load is being held by brace apparatus 1, spacing members 77$a$–$f$ experience little or no compression. By providing spacing members 77$a$–$f$ that undergo little compression under normal circumstances, bearing members 60$a,c$ and bearing members 60$b,d$ operate as a single bearing member when little or no load is placed on the bearing members 60$a$–$c$. However, when forces are exerted on brace apparatus 1 such that core member 10 undergoes plastic deformation, spacing members 77$a$–$f$ are compressed, allowing the core member to expand or thicken while limiting the amount of friction generated between core member 10 and bearings 60$a,b$.

FIG. 5A is a schematic view illustrating core member 10 according to one embodiment of the present invention. In the illustrated embodiment, core member 10 includes a first end 12, a second end 14, a middle portion 16, and projections 18$a,b$. Projections 18$a,b$ are adapted such that cementious layer 50 surrounding the core member 10 contacts projections 18$a,b$. By contacting projections 18$a,b$, core member 10 is prevented from sliding with relation to buckling restraining assembly 30.

In the illustrated embodiment, first and second projections 18$a,b$ are contiguous with core member middle portion 16. By allowing projections 18$a,b$ to contact with cementious layer 50, projection 18$a,b$ are adapted to minimize movement of the core member middle portion 16 relative to the portion of buckling restraining assembly 30 corresponding to core member middle portion 16. Projections 18a,b are also adapted to prevent buckling restraining assembly 30 from sliding in relation core member 10 when little or no load is being supported by support brace 1.

In one embodiment of the present invention, projections 18a,b and core member first end, second end, and middle portions 12, 14, 16 are of uniform construction. In an alternative embodiment, projections 18a,b are rigidly coupled to one or more portions of core member 10. In the illustrated embodiment, projections 18a,b are coupled to the top and bottom of core member middle portion 16. In an alternative embodiment, projections 18a,b are coupled to the side of core member middle portion 16. In one embodiment, projections 18a,b are bonded to cementious layer 50. In an alternative embodiment, projections 18a,b are not bonded to the cementious layer 50.

When a force is exerted on support brace 1 and core member 10 undergoes plastic deformation, the portions of core member 10 having projections are not displaced relative to buckling restraining assembly 30. For example, in the illustrated embodiment, where sufficient compressive and tensile forces are exerted on brace apparatus 1 such that core member 10 is deformed, projections 18a,b retain core member middle portion 16 at a consistent position relative to the middle portion of buckling restraining assembly 30. The bonding of projections 18a,b and cementious layer 50 prevents lateral movement of the core member middle portion 16 relative to the portion of buckling restraining assembly 30 corresponding to core member middle portion 16. This allows core member 20 to be compressed and elongated such that the displacement between the core member first and second ends 12, 14 and the core member middle portion 16 increases and decreases, while maintaining the relative position of the core member middle portion 16 to the buckling restraining assembly 30.

FIG. 5B is a perspective view illustrating the juxtaposition of the bearing members 60a–d to core member 10 of FIG. 5A according to one embodiment of the present invention. In the illustrated embodiment, bearing members 60a–d correspond with portions of core member 10 not having projections 18a,b. As previously discussed, bearing members 60a–d are adapted to limit the amount of friction between bearing members 60a–d and core member 10. Bearing members 60a–d are positioned internal to and affixed to the cementious layer 50. Bearing members 60a–d terminate at core member middle portion 16 to allow cementious layer 50 to contact the projections 18a,b.

FIG. 5C is a close-up view depicting air gaps 70a,b located between bearing members 60a,b and core member 10 according to one embodiment of the present invention. In the illustrated embodiment, the width of air gaps 70a,b is between 1–50 thousandths of an inch. Because expansion of the core member 10 due to compression is typically in the range of less that $\frac{1}{100}^{th}$ of an inch, air gaps 70a,b having a width of less than one-hundredth of an inch are sufficient to accommodate expansion of core member 10 under typical situations. Providing air gaps 70a,b having a narrow width allows for expansion of core member 10 while limiting the lateral displacement core member 10. Because lateral displacement of core member 10 can result in a potential weakening of brace apparatus 1, limiting the width of air gaps 70a,b reduces the potential for such weakening.

FIG. 6A is a cross-sectional view illustrating reinforcement assembly 78 and its juxtaposition to the buckling restraining assembly 30, core member 10, and lateral supports 20a,c according to one embodiment of the present invention. In the illustrated embodiment, lateral supports 20a,c are coupled to core member 10. Lateral supports 20a,c are located at, and provide additional support to, the core member first end 12. The portions of lateral support 20a,c positioned nearest the core member middle portion 16 are surrounded by the buckling restraining assembly 30. By surrounding portions of lateral supports 20a,c with buckling restraining assembly 30, additional support is provided to the core member first end 12, preventing buckling of the core member first end 12. Bearing members 60c,d of buckling restraining assembly 30 are adapted to limit friction between the buckling restraining assembly 30 and core member 10. Bearing members 60e,f are also positioned adjacent lateral supports 20a,c. Bearing members 60e,f are adapted to limit friction between the buckling restraining assembly 30 and lateral supports 20a,c.

Brace apparatus 1 also includes a reinforcement assembly 78. Reinforcement assembly 78 is adapted to enclose: 1) the portion of lateral supports 20a,c corresponding with buckling restraining assembly 30; 2) the portion of the bearing members 60c–f corresponding with the portion of lateral supports 20a,c; and 3) the portion of the core member 10 corresponding with the portion of lateral supports 20a,c and the buckling restraining assembly 30. In additional to providing strength to core member first end 12, reinforcement assembly 78 prevents cementious layer 50 from infiltrating the air gaps between core member 10 and bearing members 60c–f. The reinforcement assembly 78 is positioned between the bearing members 60c–f and the cementious layer 50 at the portion of buckling restraining assembly 30 corresponding with portion of lateral supports 20a,c.

In the illustrated embodiment, reinforcement assembly 78 extends beyond lateral supports 20a,c in the direction of the core member middle portion 16. The portions of reinforcement assembly 78 extending beyond lateral supports 20a,c form void 90. Void 90 is adapted to permit end portions of lateral supports 20a,c unimpededly to move relative to the buckling restraining assembly 30 in the direction of core member middle portion 16 when core member 10 is compressed.

FIG. 6B is a cross-sectional view (see cross section 6B of FIG. 6A) illustrating reinforcement assembly 78 and its juxtaposition to the buckling restraining assembly 30, core member 10, and lateral supports 20a,c according to one embodiment of the present invention. Reinforcement assembly 78 is located internally to, and in contact with, cementious layer 50. Reinforcement assembly 78 is adapted to enclose: 1) the portion of lateral supports 20a,c corresponding with buckling restraining assembly 30; 2) a portion of the bearing members 60e–h; and 3) the portion of the core member 10 corresponding with the portion of lateral supports 20a,c and buckling restraining assembly 30.

In the illustrated embodiment, reinforcement assembly 78 comprises angle members 80a–d and end cap members 80e–h. The configuration of the angle members 80a–d of the present embodiment results in cavities 82a–d. In, an alternative embodiment, angle members 80a–d are configured such that the end cap members touch the ends of core member 10 and lateral supports 20a,b. As will be appreciated by those skilled in the art, reinforcement assembly 78 can have a variety of elements arranged in any of a variety of configurations without departing from the scope or spirit of the present invention. For example, reinforcement assembly can be of a single uniform construction, rather than being comprised of a plurality of members.

In the illustrated embodiment, six bearing members 60c–h are enclosed in reinforcement assembly 78. Bearing member 60c is positioned adjacent a first side of core member 10. Bearing member 60d is positioned adjacent a second side of core member 10. Bearing members 60e corresponds with a first side of lateral support 20a. Bearing member 60h corresponds with a second side of lateral support 20a. Bearing member 60f corresponds with a first side of lateral support 20c. Bearing member 60g corresponds with a second side of lateral support 20c. Air gaps 70a and 70b are positioned between bearing members 60c, 60d and core member 10. Spacers 71a–d are provided to maintain the air gap during manufacture of the brace apparatus 1. In the preferred embodiment, the width of air gaps 70a,b at the reinforcement assembly is less than the width of air gaps 70a,b closer to core member middle portion 16. By providing air gaps 70a,b having a more narrow width at the portions of the core member 10 corresponding with the reinforcement assemblies than at the core member middle portion 16, less axial movement of the core member 10 is permitted, reducing the likelihood of core member buckling at these positions.

FIG. 7A is a perspective view illustrating an alternative embodiment of the brace apparatus 1 in which lateral support 20a extend the length of the core member 10. Lateral support members 20a,c are coupled to core member 10 and are adapted to provide additional support to core member 10. Because lateral supports 20a,b extend the entire length of core member 10, they provide lateral support for most, or all, of the length of core member 10. Brace apparatus 1 having lateral supports 20a,b running the length of the core member can be employed where the size of the brace apparatus 1, or the magnitude of the forces to be absorbed, require additional rigidity for the entire length of the core member 10.

This embodiment also includes first and second reinforcement assemblies 78a,d. First and second reinforcement assemblies 78a,d are adapted to enclose a plurality of bearing members 60a–d, a portion of the lateral support members 20a,b, and a portion of core member 10. The reinforcement assemblies 78a,d are adapted to be positioned between bearing members 60a–d and the cementious layer 50 of the buckling restraining assembly 30. It can be seen that first and second reinforcement assemblies 78a–d do not extend for the entire length of lateral supports 20a,b. This is due to the fact that the projections 18a,b of core member 10 are adapted to be in contact with cementious layer 50. Reinforcement assembly 78a corresponds with the plurality of bearing members between the middle portion of brace apparatus 1 and the first end of brace apparatus 1. Reinforcement assembly 78b corresponds with the plurality of bearing members between the middle portion of brace apparatus 1 and the second end of brace apparatus 1.

FIG. 7B is a cross sectional view illustrating the juxtaposition of core member 10, lateral supports 20a,b, buckling restraining assembly 30, and reinforcement assembly 78 according to one embodiment of the present invention. In the embodiment, eight bearing members 60a–h are utilized for each end of the buckling restriction assembly 30. Four bearing members 60a–c are utilized for the cross member 10, two bearing members 60e,f are utilized for lateral support 20a, and two bearing members 60g,h are utilized for lateral supports 20b. In the illustrated embodiment, air gaps 70a–h are positioned between bearing members 60a–h and both cross member 10 and lateral supports 20a,b. Spacers 71a–o are utilized to maintain the air gaps 70a–h during manufacture of brace apparatus 1. A greater number of spacers 71a–o are utilized in the illustrated embodiment than the embodiment of FIG. 6B due to the increased number and configuration of bearing members 60a–h.

One presently preferred method of manufacturing brace apparatus 1 will now be described in relation to the embodiment shown in FIGS. 1–3. First, core member 10 and lateral supports 20a–d are fabricated in the forms shown in FIG. 2 according to known methods. Next, lateral supports 20a,c are welded to core member first end 12, and lateral supports 20b,d are welded to the core member second end 14. Next, spacers 71a–d are positioned within elongated slots 72a–d of bearing members 60a,b, and bearing members 60a,b are positioned adjacent opposing sides of the core member middle portion 16, with spacers 71a–d being interposed between bearing members 60a,b and core 10. End spacers 75a,b are then positioned adjacent the remaining two sides of the middle portion 10 of core 10, and seals 74a,b are affixed to the outer surfaces of bearing members 60a,b and end spacers 75a,b as illustrated in FIG. 3. The core member 10 is then inserted through and positioned within steel tube 40 such that core member first and second ends 12 and 14 extend out the opposing ends of steel tube 40. Cement is then introduced into space between the core assembly and steel tube 40 and allowed to harden to form cementious layer 50. Once the cementious layer 50 has hardened to a predetermined state, spacers 71a–d are removed from buckling restraining assembly 30 by withdrawing them from elongated slots 72a–d.

Seal 74 is provided to maintain the position of the spacers between the core member 10 and the bearing members 60a–n. The seal 74, bearing members 60a–n, core member 10, and spacers 71a–n are then inserted into and positioned within to support tube 40. The cementious layer 50 is then positioned between the support tube 40 and the seal 74, bearing members 60a–n, etc.

In one embodiment, cementious material is poured into the support tube in a liquid or semi-liquid state around the seal 74, bearing members 60a–n, core member 10, and spacers 71a–n to form cementious layer 50. The seal 74 is adapted to prevent the cementious material from entering the one or more air gaps 70. Spacers 71a–n are adapted to maintain the one or more air gaps 70 while the cementious layer 50 solidifies. Once the cementious layer 50 is solidified spacers 71a–n are removed. In one embodiment spacers 71a–n comprise metal rods. In an alternative embodiment spacers 71a–n comprise fiberglass or plastic shafts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A brace apparatus comprising:
   a core member having a first end, a second end, and a middle portion;
   a buckling restraining assembly surrounding at least the middle portion of the core member, the buckling restraining assembly comprising:
   a metal support positioned external to the core member;
   a rigid cementitious layer coupled to the metal support and surrounding the core member; and
   at least two separate bearing members each of which is interposed between the rigid layer and the core member so that one side of the bearing member is in direct contact with the rigid layer, and an opposite side of the bearing member is not in direct contact with the core member such that an air gap is formed between the core member and the bearing members; the core member is comprised of a single piece of metal.

2. The brace of claim 1, wherein the core member comprises a metal core support.

3. The brace apparatus of claim 1, wherein the first and second ends of the core member are adapted to provide a mechanism for coupling the brace apparatus to other structural members.

4. The brace apparatus of claim 1, wherein the metal support comprises a metal tube.

5. The brace apparatus of claim 4, wherein the metal tube surrounds at least the middle portion of the core member.

6. The brace apparatus of claim 1, wherein the cementitious layer is bonded to a portion of the core member.

7. The brace apparatus of claim 6, wherein the cementitious layer is bonded to projections included on a portion of the core member.

8. The brace apparatus of claim 1, further comprising one or more lateral supports adapted to provide additional support to one or both of the first end and second end of the core member.

9. A brace apparatus adapted to absorb kinetic energy comprising:
   a steel core member having a first end, a second end, and a middle portion;
   one or more lateral supports adapted to provide additional support to at least one of the first and the second end of the steel core member;
   a buckling restraining assembly surrounding the middle portion of the steel core member, the buckling restraining assembly comprising:
      a metal support positioned external to the core member;
      a cementitious rigid layer coupled to the metal support and circumscribing the core member; and
      a plurality of bearing members each of which is interposed between the rigid layer and the steel core member so that each bearing member has one side that is in direct contact with the rigid layer and an opposite side that is not in direct contact with the steel core member such that an air gap is formed between the bearing members and the core member.

10. The brace apparatus of claim 9, wherein the rigid layer has less elasticity than the steel core member.

11. The brace apparatus of claim 9, wherein the one or more lateral supports comprise a plurality of lateral supports adapted to provide additional support to the first and second end of the steel core member.

12. The brace apparatus of claim 11, wherein the plurality of lateral supports are adapted to provide an attachment mechanism for coupling the brace apparatus to other structural members.

13. The brace apparatus of claim 11, wherein portions of the plurality of lateral supports are surrounded by the buckling restraining assembly.

14. The brace apparatus of claim 13, wherein the portion of each of the plurality of lateral supports surrounded by the buckling restraining assembly corresponds to one of the plurality of bearing members.

15. The brace apparatus of claim 14, further comprising one or more reinforcement assemblies adapted to contain the portions of the plurality of lateral supports corresponding with buckling restraining assembly, portions of the plurality of bearing members, and the portion of the steel core member corresponding with the portion of the plurality of lateral supports corresponding with buckling restraining assembly.

16. The brace apparatus of claim 15, wherein the one or more reinforcement assemblies are positioned between the plurality of bearing members and the rigid layer at the portion of the buckling restraining assembly corresponding with the portions of the plurality of lateral supports corresponding with the buckling restraining assembly.

17. The brace apparatus of claim 16, wherein the one or more reinforcement assemblies extend beyond the plurality of lateral supports in the direction of the middle portion of the steel core member such that the portions of the one or more reinforcement assemblies extending beyond the plurality of lateral supports form a void adapted to permit end portions of the plurality of lateral supports nearest the steel core member middle portion to move in the direction of the steel core member middle portion when the steel core member is compressed.

18. A brace apparatus adapted to absorb energy by providing plastic deformation while being resistant to buckling, the brace apparatus comprising:
   a core member having a first end, a second end, and a middle portion;
   one or more lateral supports adapted to provide additional support to the core member;
   a buckling restraining assembly circumscribing the middle portion of the core member comprising:
      a support tube surrounding a portion of the core member;
      a rigid cementitious layer internal to the support tube; and
      a plurality of bearing members interposed between the rigid layer and the core member such that one side of each bearing member is in direct contact with the rigid layer, and an opposite side is spaced apart from the core member so that it is not in direct contact with the core member such that an air gap is formed between the core member and the bearing members.

19. The brace apparatus of claim 18, wherein the air gap is adapted to prevent bonding of the core member and the buckling restraining assembly.

20. The brace apparatus of claim 18, wherein the lateral supports are coupled to the core member.

21. The brace apparatus of claim 18, wherein the lateral supports provide lateral support for at least most of the length of the core member.

22. The brace apparatus of claim 18, further comprising one or more reinforcement assemblies adapted to contain the plurality of bearing members, a portion of the lateral supports, and a portion of the core member.

23. The brace apparatus of claim 22, wherein the plurality of bearing members are positioned adjacent the core member and the lateral supports.

24. The brace apparatus of claim 23, wherein the one or more reinforcement assemblies comprise first and second reinforcement assemblies, wherein the first reinforcement assembly corresponds with the plurality of bearing members between a middle portion of the brace apparatus and a first end of the brace apparatus, and wherein the second reinforcement assembly corresponds with the plurality of bearing members between the middle portion of the brace apparatus and a second end of the brace apparatus.

25. The brace apparatus of claim 22, wherein the one or more reinforcement assemblies are positioned between the plurality of bearing members and the rigid layer.

26. In an improved brace apparatus, adapted to absorb energy by providing plastic deformation of a core member during seismic activity so as to be resistant to buckling, the brace apparatus having a buckling restraining assembly comprising a concrete filled tube circumscribing at least a middle portion of the core member, the improvement comprising:

bearing members interposed between the core member and the concrete filling of said tube, each said bearing members comprising a first surface in direct contact with the concrete filling, and a second surface that is opposite to the first surface and that is not in direct contact with the core member such that an air gap is formed between the core member and the; the core member is comprised of a single piece of metal bearing members.

27. A brace apparatus comprising:

a core member having a first end, a second end, and a middle portion;

a buckling restraining assembly circumscribing the middle portion of the core member, the buckling restraining assembly comprising:
    a metal support positioned external to the core member;
    a cementitious rigid layer coupled to the metal support and circumscribing the core member; and a plurality of bearing members interposed between the rigid layer and the core member wherein a first bearing member is positioned adjacent to a core member first side and a second bearing member is positioned adjacent a core member second side, such that an air gap is positioned between the first bearing member and the core member first side and an air gap is positioned between the second bearing member and the core member second side, one side of each bearing member is in direct contact with the rigid layer.

28. The support brace of claim 27, wherein a third bearing member is positioned between the first bearing member and the rigid layer and a fourth bearing member is positioned between the second bearing and the rigid layer.

29. The support brace of claim 28, wherein the third bearing member and the fourth bearing member are coupled to the rigid layer.

30. The support brace of claim 28, wherein an air gap is positioned between the first bearing member and the third bearing member and an air gap is positioned between the second bearing member and the fourth bearing member.

31. The support brace of claim 30, wherein one or more spacers are positioned between the first bearing member and the third bearing member and one or more spacers are positioned between the second bearing member and the fourth bearing member.

32. The support brace of claim 31, wherein the spacers are adapted to maintain the air gaps between the first and third bearing member and the air gaps between the second bearing member and the fourth bearing member.

33. The support brace of claim 32, wherein the air gaps and spacers are adapted to allow for an increase in the thickness of the core member due to plastic deformation caused by compression of the core member.

34. The support brace of claim 32, wherein the spacers are comprised of rubberized foam.

* * * * *

UNITED STATES PATENT AND TRADEMARK OFFICE
CERTIFICATE OF CORRECTION

PATENT NO. : 7,174,680 B2 Page 1 of 1
APPLICATION NO. : 10/158738
DATED : February 13, 2007
INVENTOR(S) : James M. Smelser It is certified that error appears in the above-identified patent and that said Letters Patent is hereby corrected as shown below:

In Column 15

Line 9, claim 26, after "tube," please delete the word " each ".

Line 14, Claim 26, please insert after "the" (second occurrence) and before ";"
-- bearing members --.

Lines 15-16, Claim 26, after "metal" please delete " bearing members ".

Signed and Sealed this

Fourteenth Day of August, 2007

JON W. DUDAS
*Director of the United States Patent and Trademark Office*